(12) United States Patent
Weng et al.

(10) Patent No.: US 10,500,934 B1
(45) Date of Patent: Dec. 10, 2019

(54) LOCKING DEVICE AND SYSTEM FOR TRUCK COVER

(71) Applicant: Ningbo Diroan Auto Accessories Co., Ltd., Cixi, Zhejiang (CN)

(72) Inventors: Rongjie Weng, Zhejiang (CN); Fangliang Weng, Zhejiang (CN)

(73) Assignee: NINGBO DIROAN AUTO ACCESSORIES CO., LTD., Cixi (CN)

( * ) Notice: Subject to any disclaimer, the term of this patent is extended or adjusted under 35 U.S.C. 154(b) by 0 days.

(21) Appl. No.: 16/563,227

(22) Filed: Sep. 6, 2019

(30) Foreign Application Priority Data

Jul. 11, 2019  (CN) .................... 2019 2 1080475 U

(51) Int. Cl.
| | |
|---|---|
| *B60J 7/185* | (2006.01) |
| *B60J 7/19* | (2006.01) |
| *B60P 7/02* | (2006.01) |
| *B60J 7/16* | (2006.01) |

(52) U.S. Cl.
CPC ............. *B60J 7/198* (2013.01); *B60J 7/1607* (2013.01); *B60J 7/1856* (2013.01); *B60J 7/1858* (2013.01); *B60P 7/02* (2013.01)

(58) Field of Classification Search
CPC ........ B60J 7/198; B60J 7/1607; B60J 7/1856; B60J 7/1858; B60J 7/141; B60J 7/104; B60P 7/02; B60P 7/04
USPC ............ 296/100.16, 100.07, 100.12, 136.03, 296/136.12, 100.18
See application file for complete search history.

(56) References Cited

U.S. PATENT DOCUMENTS

| | | | | |
|---|---|---|---|---|
| 4,273,377 | A * | 6/1981 | Alexander ............... | B60J 7/062 296/100.12 |
| 6,203,086 | B1 * | 3/2001 | Dirks ....................... | B60R 9/00 224/404 |
| 6,719,353 | B1 * | 4/2004 | Isler ......................... | B60J 7/102 296/100.16 |
| 8,128,149 | B1 * | 3/2012 | Wolf ......................... | B60J 7/10 160/371 |
| 10,106,022 | B2 | 10/2018 | Xu | |
| 10,414,256 | B2 * | 9/2019 | Frederick ................. | B60J 7/198 |
| 2001/0020792 | A1 * | 9/2001 | Huotari ..................... | B60J 7/10 296/100.16 |

(Continued)

FOREIGN PATENT DOCUMENTS

CN         201703444 U        1/2011

*Primary Examiner* — Gregory A Blankenship
(74) *Attorney, Agent, or Firm* — Brinks Gilson & Lione

(57) ABSTRACT

The present disclosure discloses a locking structure and a pickup truck compartment cover including the locking structure. The locking structure includes two fixing side frames and a locking frame. A locking slot is disposed on an inner side wall of the fixing side frame. Locking cartridge assemblies corresponding to the fixing side frames are respectively disposed at both ends of the locking frame, and the locking frame is further provided with a sliding cartridge assembly. The locking cartridge assembly comprises a locking cartridge, a locking member, and at least one locking spring. The sliding cartridge assembly comprises a control cartridge, a sliding handle, and an inhaul cable member, When the locking frame is mounted at the end portions of the two fixing side frames, the sliding handle is configured to drive the inhaul cable member to make a lock tongue break away from a locking slot.

16 Claims, 13 Drawing Sheets

(56) References Cited

U.S. PATENT DOCUMENTS

| | | | |
|---|---|---|---|
| 2002/0096268 A1* | 7/2002 | Schmeichel | B60J 7/102 |
| | | | 160/328 |
| 2005/0146158 A1* | 7/2005 | Schmeichel | B60J 7/102 |
| | | | 296/100.16 |
| 2006/0049659 A1* | 3/2006 | Wheatley | B60J 7/102 |
| | | | 296/100.16 |
| 2013/0341956 A1* | 12/2013 | Garska | B23P 11/00 |
| | | | 296/100.16 |
| 2015/0069780 A1* | 3/2015 | Xu | B60J 7/1607 |
| | | | 296/100.17 |
| 2016/0355078 A1* | 12/2016 | Williamson | B60J 7/198 |
| 2017/0259655 A1* | 9/2017 | Dylewski, II | B60J 7/141 |
| 2018/0345768 A1* | 12/2018 | Frederick | B60J 7/198 |

\* cited by examiner

LOCKING DEVICE AND SYSTEM FOR TRUCK COVER

RELATED APPLICATION

This application claims priority to Chinese Patent Application No. 201921080475.0, filed with China National Intellectual Property Administration on Jul. 11, 2019, which is incorporated herein by reference in its entirety.

TECHNICAL FIELD

The present disclosure relates to a pickup truck accessory, and in particular, to a locking structure and a pickup truck compartment cover including the locking structure.

BACKGROUND

A pickup truck may include an open back compartment, which may be configured to transport cargoes. When cargoes are transported in severe weather, a compartment cover is usually mounted at a top portion of the back compartment to the pickup truck to protect the transported cargoes. An existing compartment cover of a light pickup truck may include a connection frame and a soft cover. The connection frame is formed by connecting a side frame to a corner joint. The side frame includes a clamp slot. Nylon clamping members matching the clamp slot are evenly distributed on the periphery inside the soft cover, to implement a match between the soft cover and the connection frame. The soft cover implements detachable mounting on the connection frame through a match between the nylon clamping members and the clamp slot of the side frame. However, the foregoing detachable mounting structure results in complex opening and closing of the soft cover on the connection frame.

SUMMARY

An objective of the present disclosure is to provide a locking structure. A locking manner and an unlocking manner of the locking structure are both simple.

The present disclosure describes an embodiment of a locking structure. The locking structure includes two fixing side frames and a locking frame. A locking slot is disposed on an inner side wall of the fixing side frame. The locking frame is movably mounted at end portions of the two fixing side frames, locking cartridge assemblies corresponding to the fixing side frames are respectively disposed at both ends of the locking frame, and the locking frame is further provided, between the locking cartridge assemblies, with a sliding cartridge assembly controlling the two locking cartridge assemblies to synchronously open. The locking cartridge assembly comprises a locking cartridge, a locking member, and at least one locking spring, wherein the locking member is slidably mounted in the locking cartridge along a longitudinal direction of the locking frame, the locking member comprises a lock tongue inserted into the locking slot, one end of the at least one locking spring abuts against the locking cartridge, and the other end abuts against the locking member. The sliding cartridge assembly comprises a control cartridge, a sliding handle, and an inhaul cable member, wherein the sliding handle is slidably mounted in the control cartridge along a direction perpendicular to the longitudinal direction of the locking frame, two ends of the inhaul cable member are respectively connected to the locking members of the two locking cartridge assemblies, and the inhaul cable member abuts against the sliding handle. When the locking frame is mounted at the end portions of the two fixing side frames, the at least one locking spring can push the lock tongue to be clamped into the locking slot, and the sliding handle can drive the inhaul cable member to make the lock tongue break away from the locking slot.

The foregoing technical objective of the present disclosure is achieved through the following technical solutions: A locking structure includes two fixing side frames and a locking frame. The locking frame may include a locking horizontal frame. A locking slot is disposed on an inner side wall of the fixing side frame. The locking horizontal frame is movably mounted at end portions of the two fixing side frames. Locking cartridge assemblies corresponding to the fixing side frames are respectively disposed at both ends of the locking horizontal frame. The locking horizontal frame is further provided, between the locking cartridge assemblies, with a sliding cartridge assembly controlling the two locking cartridge assemblies to synchronously open. The locking cartridge assembly includes a locking cartridge, a locking member, and a locking spring. The locking member is slidably mounted in the locking cartridge along a length direction of the locking horizontal frame. The locking member includes a lock tongue inserted into the locking slot. One end of the locking spring abuts against the locking cartridge and the other end abuts against the locking member. The sliding cartridge assembly includes a control cartridge, a sliding handle, and an inhaul cable member. The sliding handle is slidably mounted in the control cartridge along a direction perpendicular to the locking horizontal frame. Two ends of the inhaul cable member are respectively connected to the locking members of the two locking cartridge assemblies. The inhaul cable member abuts against the sliding handle. When the locking horizontal frame is mounted at the end portions of the two fixing side frames, the locking spring enables the lock tongue to always have a trend to be clamped into the locking slot, and the sliding handle can drive the inhaul cable member to make the lock tongue break away from the locking slot.

By using the foregoing technical solution, when the locking horizontal frame is mounted on the end portions of the fixing side frames, the lock tongue of the locking member in the locking cartridge assembly at either end of the locking horizontal frame is inserted into the locking slot of the fixing side frame under the effect of the locking spring, to lock the locking structure. When the locking structure is unlocked, only the sliding handle of the sliding cartridge assembly needs to be slided. Under driving of the sliding handle, the inhaul cable member may overcome an elasticity of the locking spring to make the lock tongue of the locking member break away from the locking slot, and then the locking horizontal frame is taken out of the fixing side frames. A locking operation and an unlocking operation of the locking structure are both convenient, helping to implement quick locking and unlocking of the pickup truck compartment cover.

The present disclosure is further set as: the locking cartridge is provided with a locking sliding slot and a locking cover plate covering the locking sliding slot. The locking member further includes a locking sliding plate matching the locking sliding slot. The locking cartridge is further provided with a first opening for the lock tongue to extend and a second opening for ease of connection between the inhaul cable member and the locking member. By using the foregoing technical solution, the match between the locking sliding plate and the locking sliding slot can guide the sliding of the locking member, so that the stability of the sliding of the locking member is improved and the probability that the lock tongue of the locking member cannot be normally inserted into the locking slot or the lock tongue of the locking member cannot be normally break away from the locking slot is reduced.

The present disclosure is further set as: the lock tongue is connected to a middle portion of the locking sliding plate, the locking sliding plate is provided with two spring slots that are symmetrically disposed at a side surface back to the lock tongue, and the number of the locking springs in each of the locking cartridge assemblies is two and the two locking springs are respectively mounted in the corresponding spring slot.

By using the foregoing technical solution, the two locking springs respectively abut against the two spring slots of the locking sliding plate, so that the stability of the sliding of the locking member can be further improved and the probability that the lock tongue of the locking member cannot be normally inserted into the locking slot or the lock tongue of the locking member cannot be normally break away from the locking slot is reduced.

The present disclosure is further set as: the locking member further includes a pulling rod extending out of the locking cartridge from the second opening, and the pulling rod is provided with a mounting hole for mounting the inhaul cable member.

The foregoing technical solution is a manner of mounting the locking member and the inhaul cable member. The mounting manner is simple in structure and mounting is convenient.

The present disclosure is further set as: a clamp column is disposed at either end of the inhaul cable member, and the locking member is provided with a clamp hole for inserting the clamp column and a clamp slot for the inhaul cable member to extend out of the clamp hole.

The foregoing technical solution is another manner of mounting the locking member and the inhaul cable member. The inhaul cable member implements mounting with the locking member through the match between the clamp column and the clamp hole. The mounting manner is high in structural strength, the mounting structure is simple, and the mounting is convenient.

The present disclosure is further set as: the locking member is provided with a mounting slot on a side surface facing a bottom surface of the locking sliding slot, the locking cartridge is provided, on the bottom surface of the locking sliding slot, with an abutment plate inserted into the mounting slot, the locking spring is mounted in the mounting slot, and one end of the locking spring abuts against the abutment plate and the other end abuts against an inner side wall close to the lock tongue in the mounting slot.

By using the foregoing technical solution, the locking spring is mounted in the mounting slot of the locking member, so that the stability of the sliding of the locking member is improved and the probability that the lock tongue of the locking member cannot be normally inserted into the locking slot or the lock tongue of the locking member cannot be normally break away from the locking slot is reduced.

The present disclosure is further set as: the control cartridge includes a bottom cartridge and a cartridge cover, a control sliding slot for a control handle to slide is disposed on a bottom surface of the bottom cartridge, the inhaul cable member runs through a left side surface and a right side surface of the control cartridge and abuts against a side on which the control handle faces the locking horizontal frame; the control handle is provided with a handheld slot on a side back to the control sliding slot, and the cartridge cover is provided with a handle opening corresponding to the handheld slot.

By using the foregoing technical solution, the control handle is slidably mounted in an inner cavity of the control cartridge and abuts against the inhaul cable member in the inner cavity of the control cartridge, so that the control handle applies a force to the inhaul cable member more stably. In addition, setting of the handle opening and a handle slot can make it convenient for a hand of an operator to pass through the handle opening and insert into the handle slot, and make it convenient for the operator to slide the control handle.

The present disclosure is further set as: the locking horizontal frame is mounted with a guide member on two sides of the control cartridge, and the guide member is provided with a guide hole for the inhaul cable member to run through.

By using the foregoing technical solution, the guide member can guide and support expansion of the inhaul cable member, helping to reduce probability of interference between the inhaul cable member and the locking horizontal frame.

The present disclosure is further set as: the fixing side frame is further provided with a positioning seat, where the positioning seat includes a positioning clamp slot; a positioning protrusion matching the positioning clamp slot is disposed at either end of the locking horizontal frame, and a positioning end surface is further disposed at either end of the locking horizontal frame; and when the positioning protrusion is clamped into the corresponding positioning clamp slot, the positioning end surface is attached with to end surface of the fixing side frame.

By using the foregoing technical solution, the locking horizontal frame implements detachable mounting with the fixing side frames by disposing the positioning protrusion and the positioning end surface. The mounting manner is simple in structure and demounting is convenient.

Another objective of the present disclosure is to provide a pickup truck compartment cover. The locking and unlocking of the pickup truck compartment cover on the pickup truck are convenient.

The foregoing technical objective of the present disclosure is achieved through the following technical solutions:

A pickup truck compartment cover includes a fixing horizontal frame and a soft cover. The pickup truck compartment cover further includes the foregoing locking structure. The fixing horizontal frame and fixing side frames are all mounted in the compartment of the pickup truck. One end of the soft cover is mounted on the fixing horizontal frame and the other end is mounted on the locking horizontal frame, and two sides of the soft cover respectively detachably match the fixing side frames.

Based on the above, the present disclosure may have the following beneficial effects:

1. A locking structure includes two fixing side frames and a locking horizontal frame. The locking horizontal frame is detachably mounted at end portions of the two fixing side frames. Locking cartridge assemblies matching a locking slot of the fixing side frames are respectively disposed at both ends of the locking horizontal frame, and a sliding cartridge assembly controlling the two locking cartridge assemblies to synchronously open is further disposed at either end of the locking horizontal frame, thereby implementing rapid locking and rapid unlocking of the locking structure.

2. The match between the locking sliding plate of the locking member and the locking sliding slot of the locking cartridge can improve the stability of the sliding of the locking member and reduce the probability that the lock tongue of the locking member cannot be normally inserted into the locking slot or the lock tongue of the locking member cannot be normally break away from the locking slot.

3. pickup truck compartment cover, including a fixing horizontal frame, a soft cover and the foregoing locking structure. Rapid locking and rapid unlocking of the fixing side frames and the locking horizontal frame in the locking structure make opening and closing of the soft cover convenient.

Figure 1:
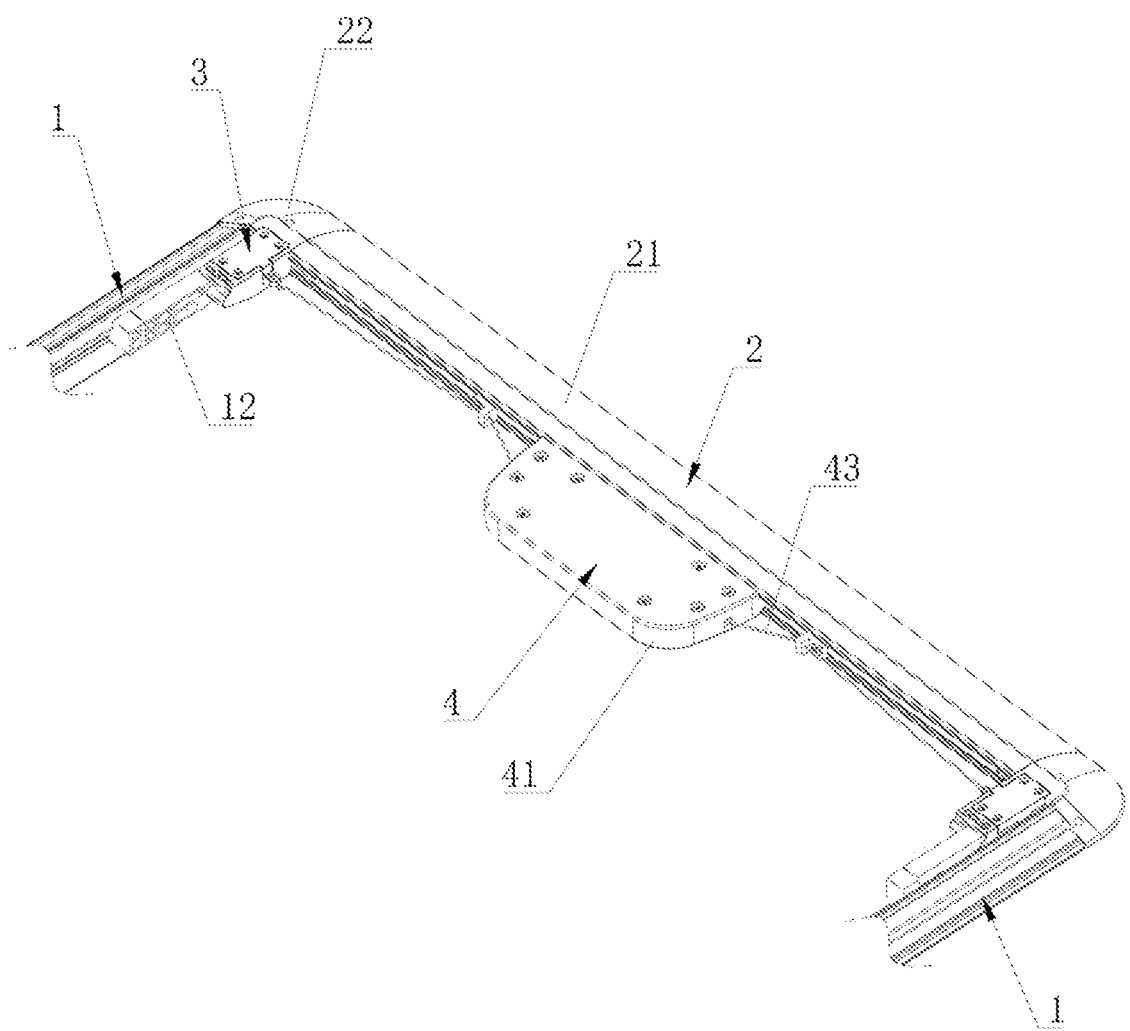
FIG. 1 is a schematic structural diagram of a locking structure according to Embodiment 1.

The figures include:
 1: Fixing side frame;
  11: Locking slot;
  12: Positioning seat;
  13: Positioning clamp slot;
 2: horizontal frame;
  21: Horizontal frame body;
  22: Corner joint;
   221: Positioning protrusion;
   222: Positioning end surface;
 3: Locking cartridge assembly;
  31: Locking cartridge;
   311: Locking sliding slot;
   312: Locking cover plate;
   313: First opening;
   314: Second opening;
   315: Abutment plate;
  32: Locking member;
   321: Lock tongue;
   322: Locking sliding plate;
   3221: Spring slot;
   323: Pulling rod;
   3231: Mounting hole;
   324: Mounting slot;
   325: Clamp hole;
   326: Clamp slot;
  33: Locking spring;
 4: Sliding cartridge assembly;
  41: Control cartridge;
   411: Bottom cartridge;
   412: Cartridge cover;
   4121: Handle opening;
   413: Through-hole via;
   414: Control sliding slot;
   415: Guide column;
   416: Guide seat;
   4161: Guide slot;
  42: Sliding handle;
   421: Control sliding block;
   422: Handheld slot;
  43: Inhaul cable member;
   431: Clamp column;
  44: Guide member;
   441: Guide hole;
 5: Fixing horizontal frame;
 6: Soft cover.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below. Please also note that the present disclosure may be embodied as methods, devices, components, or systems.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter includes combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on"

or "determined by" may be understood as not necessarily intended to convey an exclusive set of factors and may, instead, allow for existence of additional factors not necessarily expressly described, again, depending at least in part on context.

The present disclosure describes a few embodiments of a locking structure for a pickup truck.

Embodiment 1

Referring to FIG. 1, a locking structure is applied to a pickup truck compartment cover and mainly includes two fixing side frames 1 and a locking frame 2. In one implementation, the locking frame 2 may include a locking horizontal frame 2.

The two fixing side frames 1 are disposed parallel to each other, and the locking horizontal frame 2 is perpendicular to the two fixing side frames 1 and is detachably mounted at end portions of the two fixing side frames 1.

Figure 2:
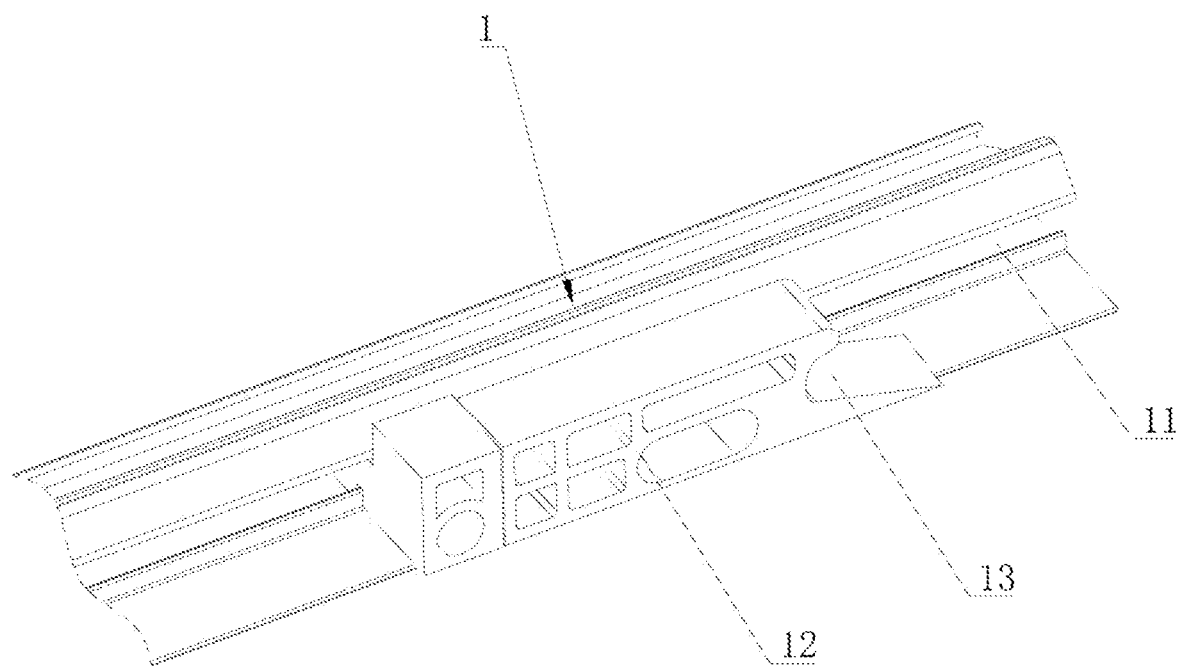
FIG. 2 is a schematic structural diagram of fixing side frames according to Embodiment 1.

Referring to FIG. 2, a locking slot 11 is disposed on an inner side wall of the fixing side frame 1 along a length direction of the fixing side frame 1, and the fixing side frame 1 is mounted with a positioning seat 12 at an end that is of the inner side wall of the fixing side frame 1 and that is close to the locking horizontal frame 2. The positioning seat is directly fixed on the inner side wall of the fixing side frame 1 by using a screw. The positioning seat 12 is provided with a positioning clamp slot 13 on a side facing the locking horizontal frame 2.

Referring to FIG. 1, the locking horizontal frame 2 includes a horizontal frame body 21 and two corner joints 22 respectively mounted at two ends of the horizontal frame body 21. Each corner joint 22 is provided with a locking cartridge assembly 3 disposed corresponding to the fixing side frame 1.

Figure 3:
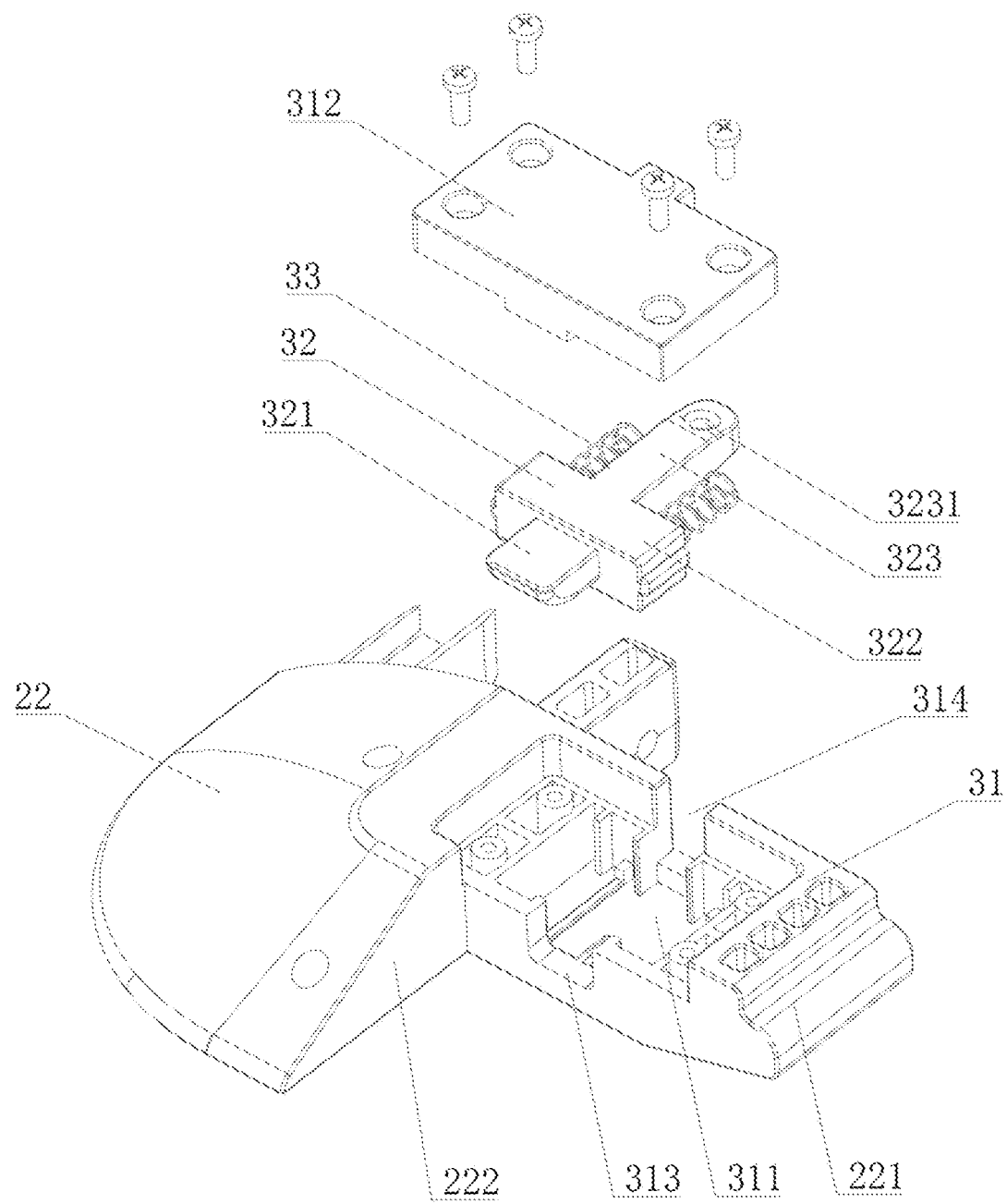
FIG. 3 is a schematic structural diagram of locking cartridge assemblies in an explosive state according to Embodiment 1.

Referring to FIG. 1 and FIG. 3, the locking cartridge assembly 3 includes a locking cartridge 31, a locking member 32, and two locking springs 33.

Referring to FIG. 1 and FIG. 3, the locking member 32 mainly includes a lock tongue 321, a locking sliding plate 322 and a pulling rod 323. The lock tongue 321 can be inserted into a locking slot 11 (referring to FIG. 2) of the fixing side frame 1, thereby implementing locking of the locking horizontal frame 2 and the fixing side frame 1.

Figure 4:
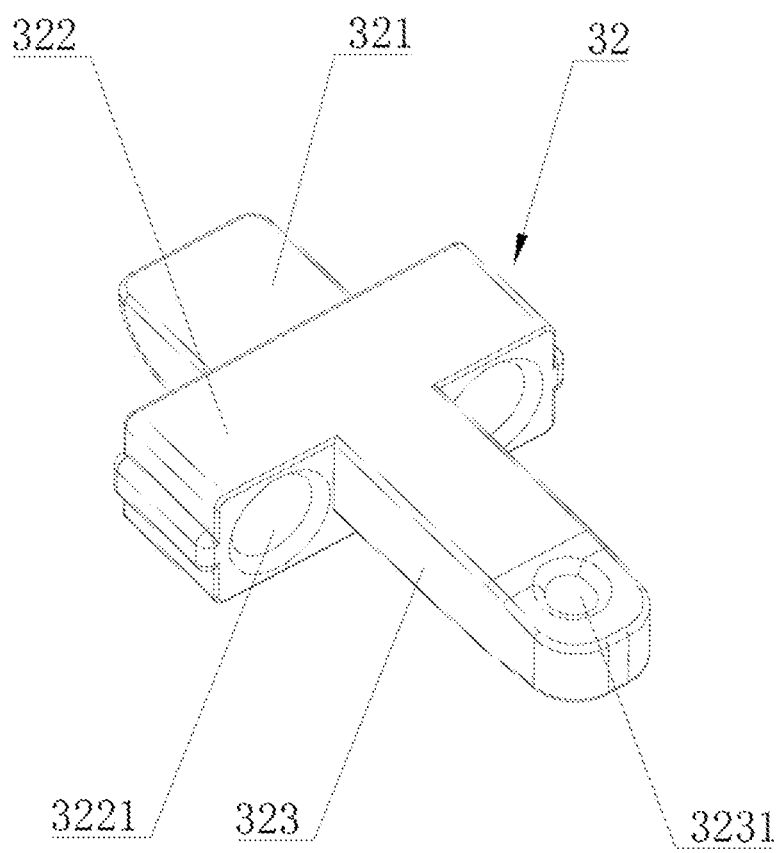
FIG. 4 is a schematic structural diagram of a locking member according to Embodiment 1.

Referring to FIG. 4, the lock tongue 321 is vertically connected to a middle portion of the locking sliding plate 322. The pulling rod 323 is connected to a middle portion of a side surface that is of the locking sliding plate 322 and that is back to the lock tongue 321. The locking sliding plate 322 is left-right symmetrically provided with two spring slots 3221 on the side surface back to the lock tongue 321. A mounting hole 3231 is disposed at an end that is of the pulling rod 323 and that is away from the locking sliding plate 322.

Referring to FIG. 3, the locking cartridge 31 is provided with a locking sliding slot 311 and a locking cover plate 312 covering the locking sliding slot 311. The locking cover plate 312 is directly mounted on the locking cartridge 31 by using a screw. The locking member 32 is slidably mounted in the locking sliding slot 311 of the locking cartridge 31 along a longitudinal direction of the locking horizontal frame 2. The locking sliding plate 322 of the locking member 32 matches the locking sliding slot 311. The longitudinal direction of the locking horizontal frame 2 may be a length direction of the locking horizontal frame.

The locking cartridge 31 is further provided with a first opening 313 for the lock tongue 321 to extend and a second opening 314 for the pulling rod 323 to extend.

The locking spring 33 is mounted in the locking cartridge 31. One end of the locking spring 33 is inserted into the spring slot 3221 of the locking sliding plate 322, and the other end abuts against a side wall that is of the locking cartridge 31 and that is in the locking sliding slot 311.

Referring to FIG. 1 to FIG. 3, the corner joint 22 is provided, at an end that is of the locking cartridge 31 and that faces the positioning seat 12, with a positioning protrusion 221 matching a positioning clamp slot 13. The corner joint 22 is further provided with a positioning end surface 222 attached to an end surface of the fixing side frame 1.

When the locking horizontal frame 2 is mounted on the two fixing side frames 1, the positioning protrusion 221 on the corner joint 22 is clamped into the positioning clamp slot 13 of the positioning seat 12. The lock tongue 321 of the locking member 32 is clamped into the locking slot 11 of the fixing side frame 1 under effect of the locking spring 33. The positioning end surface is attached to the end surface of the fixing side frame 1.

Referring to FIG. 1, the middle portion of the locking horizontal frame 2 is further mounted with a sliding cartridge assembly 4 controlling the locking cartridge assemblies 3 to synchronously unlock.

Figure 5:
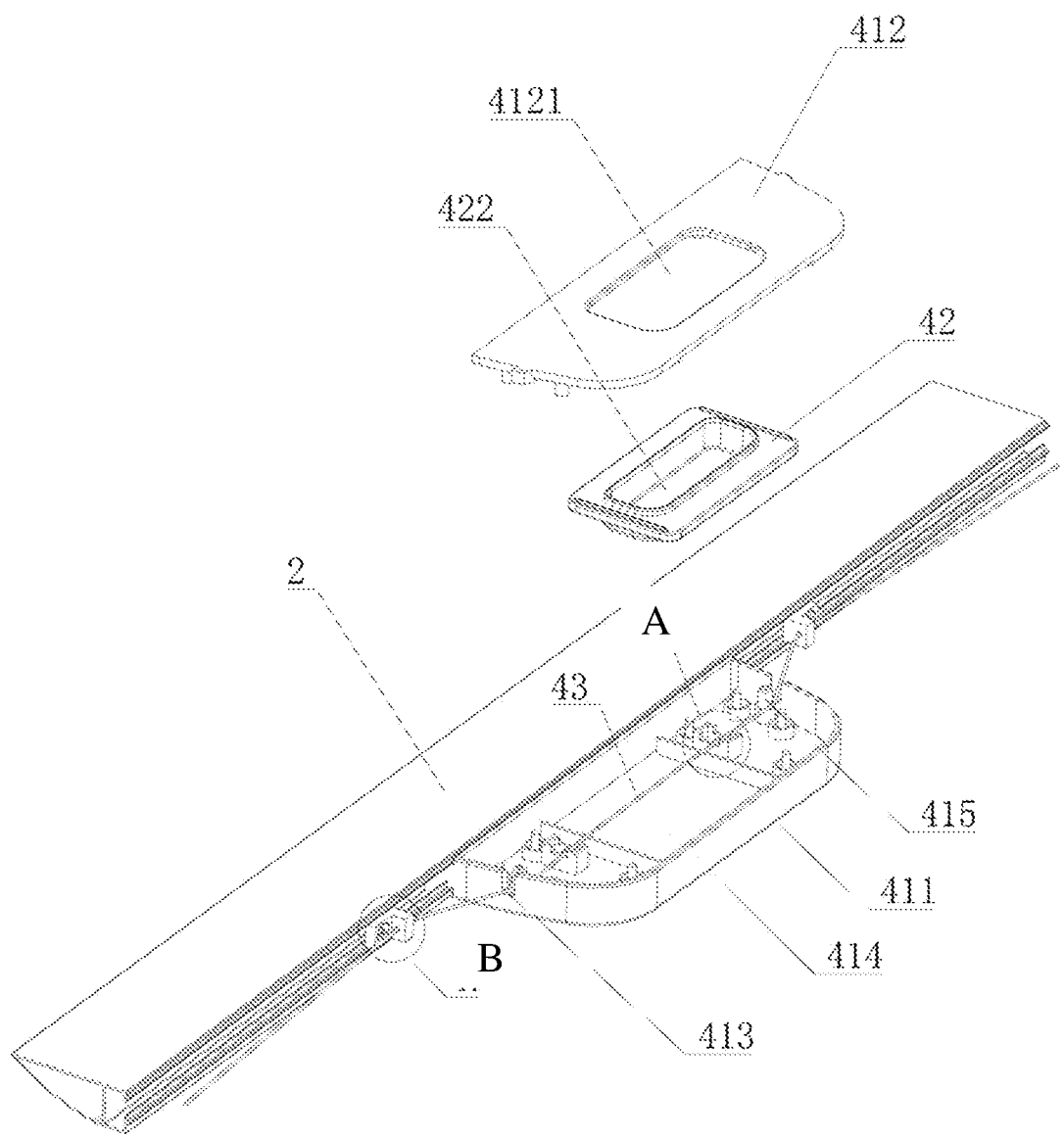
FIG. 5 is a schematic structural diagram of a sliding cartridge assembly in an explosive state according to Embodiment 1.

Referring to FIG. 1 and FIG. 5, the sliding cartridge assembly 4 includes a control cartridge 41, a sliding handle 42, and an inhaul cable member 43.

Figure 6:
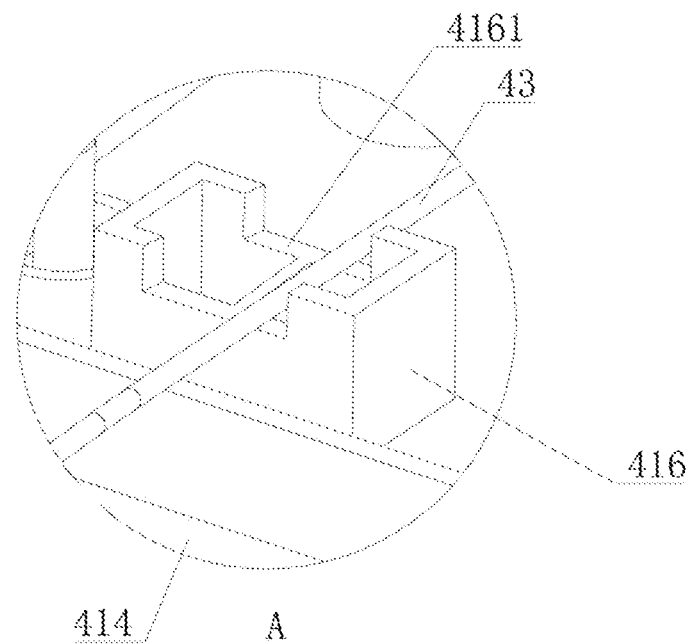
FIG. 6 is an enlarged view of a place A in FIG. 5.

Referring to FIG. 1, FIG. 5, and FIG. 6, the control cartridge 41 includes a bottom cartridge 411 and a cartridge cover 412 covering an opening of the bottom cartridge 411. The cartridge cover 412 is mounted on the bottom cartridge 411 by using a screw. The control cartridge 41 is provided, on a bottom surface of the bottom cartridge 411, with a control sliding slot 414. The control sliding slot 414 may include a sliding direction being perpendicular to the length direction of the locking horizontal frame 2. Through-hole vias 413 for the inhaul cable member 43 to run through are further symmetrically disposed on left and right sides of the control cartridge 41. A bottom surface of the bottom cartridge 411 is further provided with a guiding assembly between the control sliding slot 414 and a through-hole on the same side. In this embodiment, the guiding assembly sequentially includes a guide column 415 and a guide seat 416 from a through-hole to the control sliding slot 414. The guide seat 416 is provided with a guide slot 4161.

The cartridge cover 412 is further provided with a handle opening 4121 running through an upper end surface and a bottom end surface of the cartridge cover 412.

Figure 8:
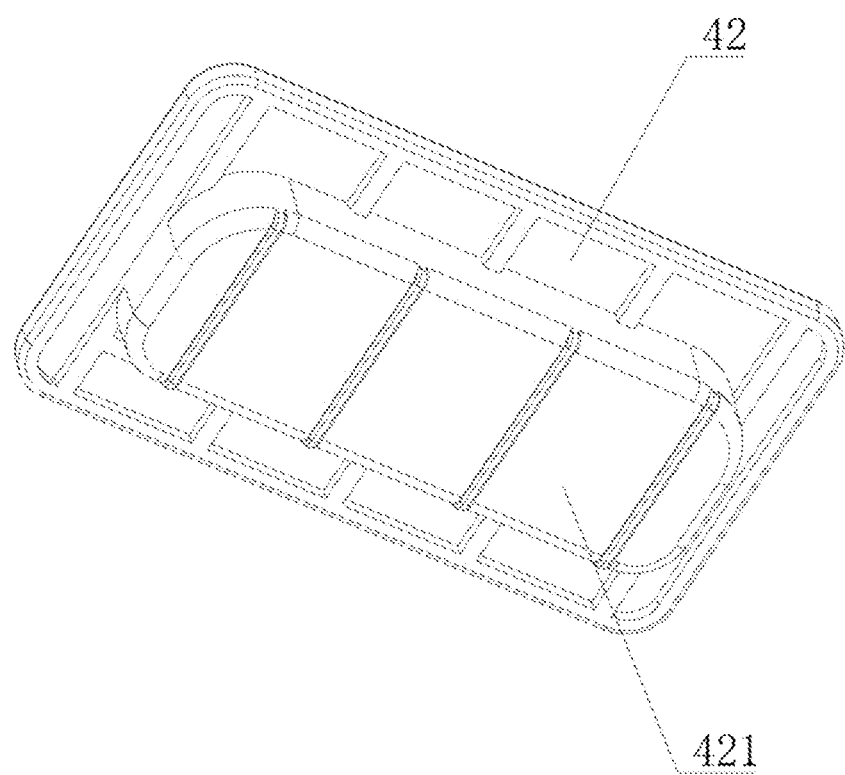
FIG. 8 is a schematic structural diagram of a bottom portion of a sliding handle according to Embodiment 1.

Referring to FIG. 5 and FIG. 8, the sliding handle 42 includes a control sliding block 421 matching the control sliding slot 414 and is provided with a handheld slot 422 on a side surface back to the control sliding block 421. The handheld slot is opposite to the handle opening 4121.

Referring to FIG. 3 and FIG. 5, the inhaul cable member 43 runs through the control cartridge 41 through the through-hole via 413. The inhaul cable member 43 abuts against a side on which the control handle faces the locking horizontal frame 2. Two ends of the inhaul cable member 43 respectively match the pulling rods 323 of the locking members 32 in the locking cartridge assemblies 3, and are bound in mounting holes 3231 of the pulling rods 323.

Figure 7:
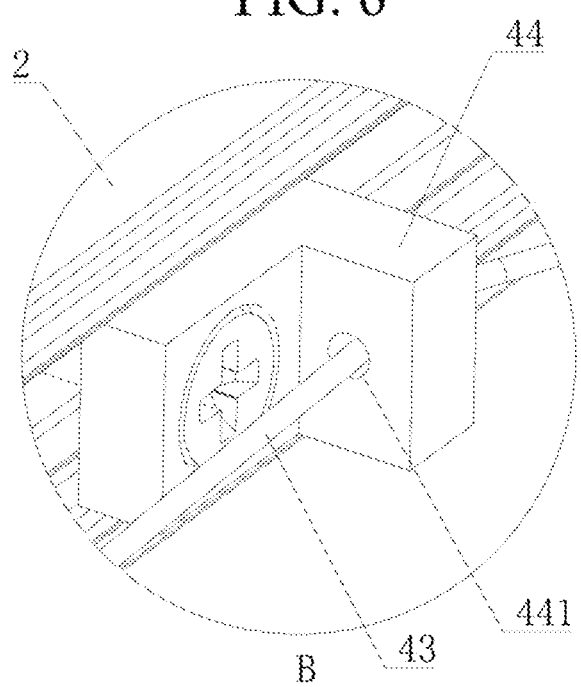
FIG. 7 is an enlarged view of a place B in FIG. 5.

Referring to FIG. 5 and FIG. 7, to support the inhaul cable member 43 and reduce the probability of interference between the inhaul cable member 43 and the locking horizontal frame 2, the locking horizontal frame 2 is provided with a guide member 44 on two sides of the control cartridge 41. The guide member 44 includes a guide hole 441 for the inhaul cable member 43 to run through. An axis of the guide hole 441 is parallel to the length direction of the locking horizontal frame 2.

When unlocking the locking structure, an operator inserts a hand into the handheld slot of the control handle and drives the control handle to slide toward a direction of the locking horizontal frame 2, to enable the control handle to pull the inhaul cable member 43, thereby driving the locking member 32 in the locking cartridge assembly 3 to overcome the pressure of the locking spring 33 and enabling the lock tongue 321 of the locking member 32 to break away from the locking slot 11 of the fixing side frame 1. When the lock tongue 321 of the locking member 32 breaks away from the locking slot 11, separation between the locking horizontal frame 2 and the fixing side frames 1 can be completed.

Embodiment 2

In this embodiment, only the structure of the locking cartridge assembly 3 is different from that in Embodiment 1, and other structures of the locking structure are all the same as those of the locking structure in Embodiment 1.

Figure 9:
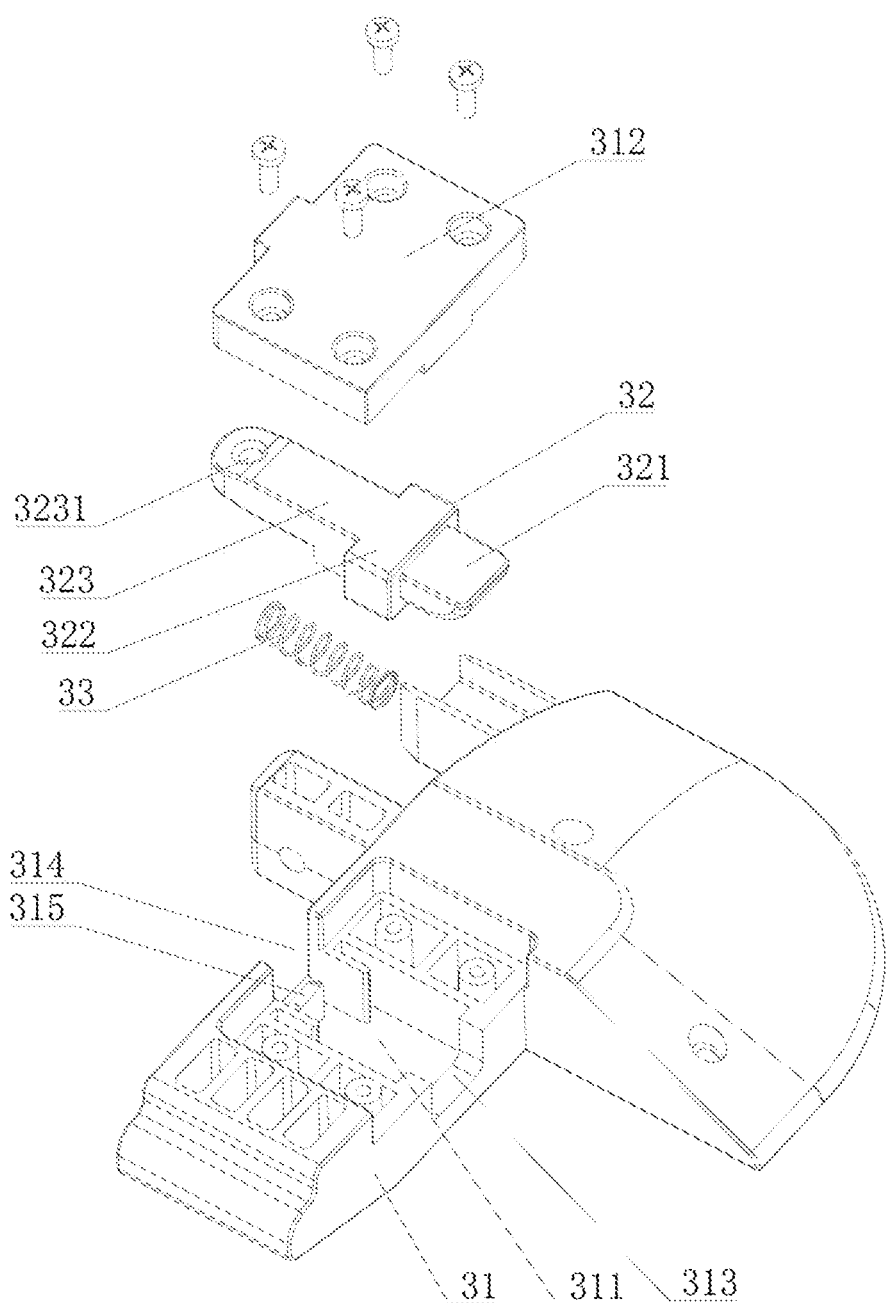
FIG. 9 is a schematic structural diagram of locking cartridge assemblies in an explosive state according to Embodiment 2.
Figure 10:
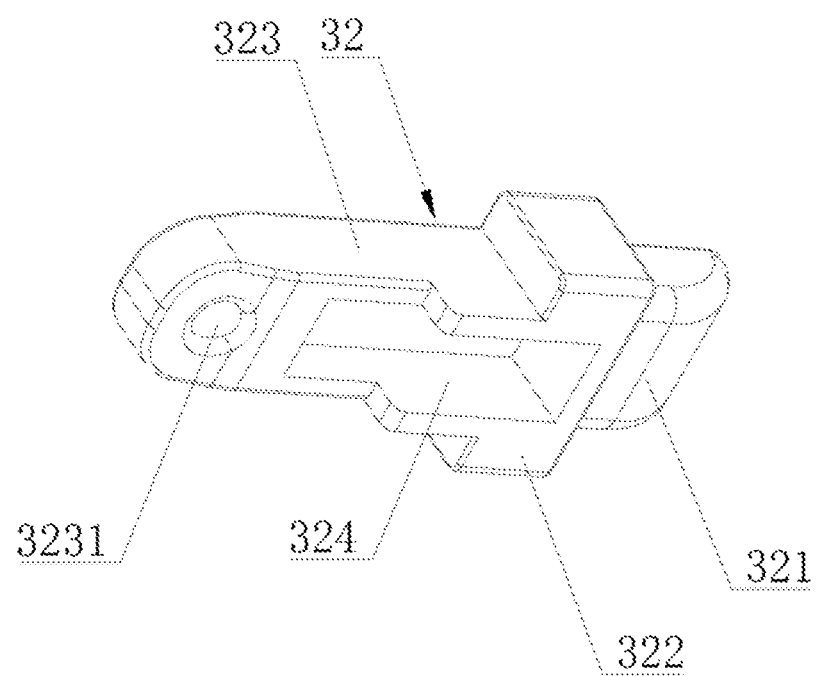
FIG. 10 is a schematic structural diagram of a locking member according to Embodiment 2.

Referring to FIG. 9 and FIG. 10, in this embodiment, the locking cartridge assembly 3 includes a locking cartridge 31, a locking member 32, and a locking spring 33. The locking member 32 mainly includes a lock tongue 321, a locking sliding plate 322, and a pulling rod 323. The lock tongue 321 is vertically connected to a middle portion of the locking sliding plate 322, the pulling rod 323 is connected to a middle portion of a side surface that is of the locking sliding plate 322 and that is back to the lock tongue 321. A mounting hole 3231 is disposed at an end that is of the pulling rod 323 and that is away from the locking sliding plate 322.

The locking cartridge 31 is provided with a locking sliding slot 311 for the locking sliding plate 322 to slide and a locking cover plate 312 covering the locking sliding slot 311. The locking cartridge 31 is provided with a first opening 313 for the lock tongue 321 to extend and a second opening 314 for the pulling rod 323 to extend.

The locking member 32 is provided with a mounting slot 324 on a side surface facing a bottom surface of the locking sliding slot 311. The locking cartridge 31 is provided, on the bottom surface of the locking sliding slot 311, with an abutment plate 315 inserted into the mounting slot 324.

The locking spring 33 is mounted in a mounting slot 324 of the locking member 32. One end of the locking spring 33 abuts against the abutment plate 315 and the other end abuts against an inner side wall close to lock tongue 321 in the mounting slot 24.

Embodiment 3

In this embodiment, only the structure of the locking cartridge assembly and mounting manners of the inhaul cable member 43 and the locking member 32 are different from those in Embodiment 1, and other structures of the locking structure are all the same as those of the locking structure in Embodiment 1.

Figure 11:
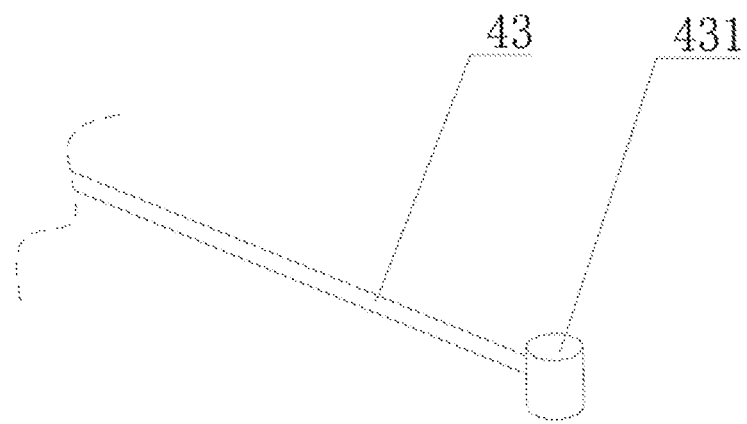
FIG. 11 is a schematic structural diagram of an end portion of an inhaul cable member according to Embodiment 3.

Referring to FIG. 11, in this embodiment, a clamp column 431 is disposed at either end of the inhaul cable member 43.

Figure 12:
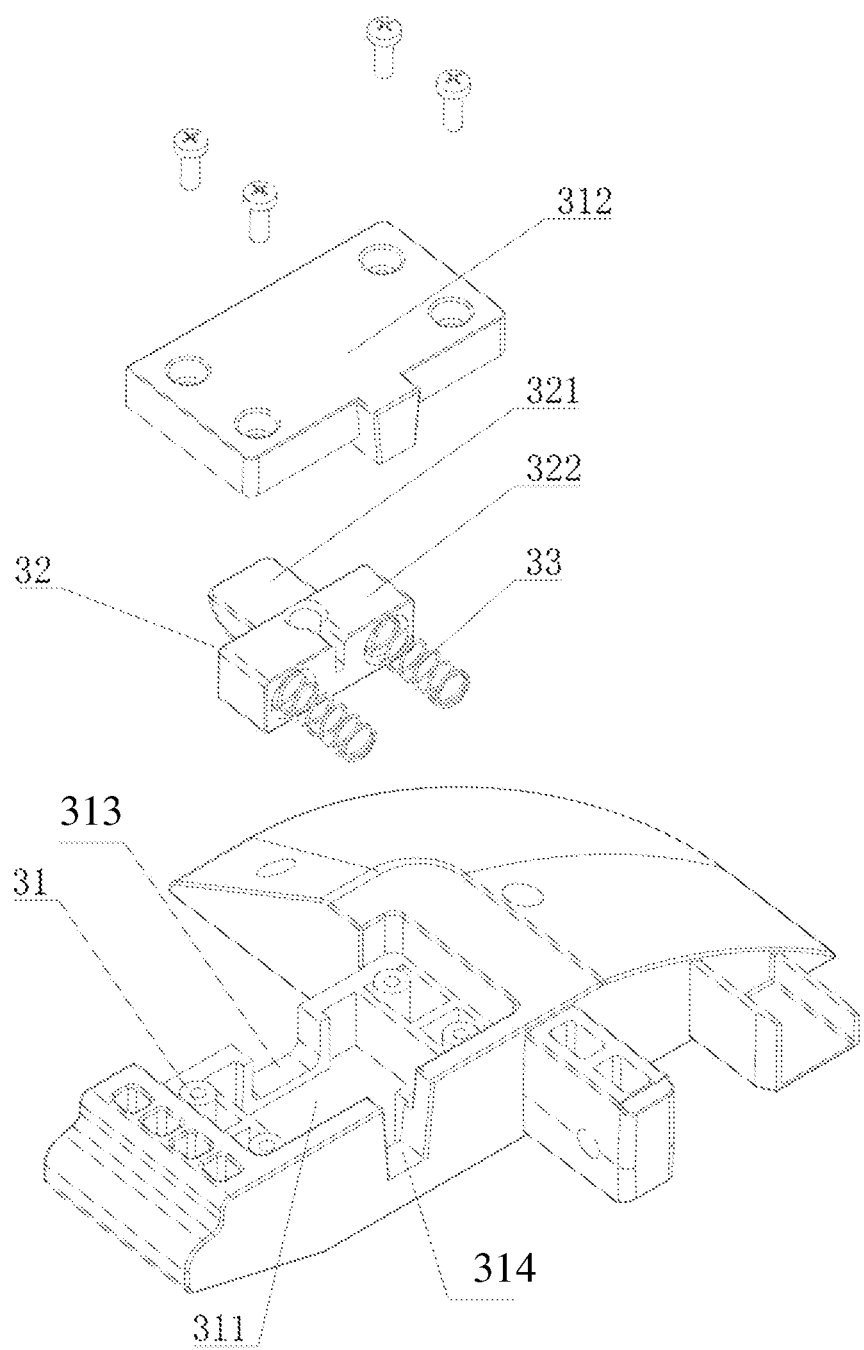
FIG. 12 is a schematic structural diagram of locking cartridge assemblies in an explosive state according to Embodiment 3.
Figure 13:
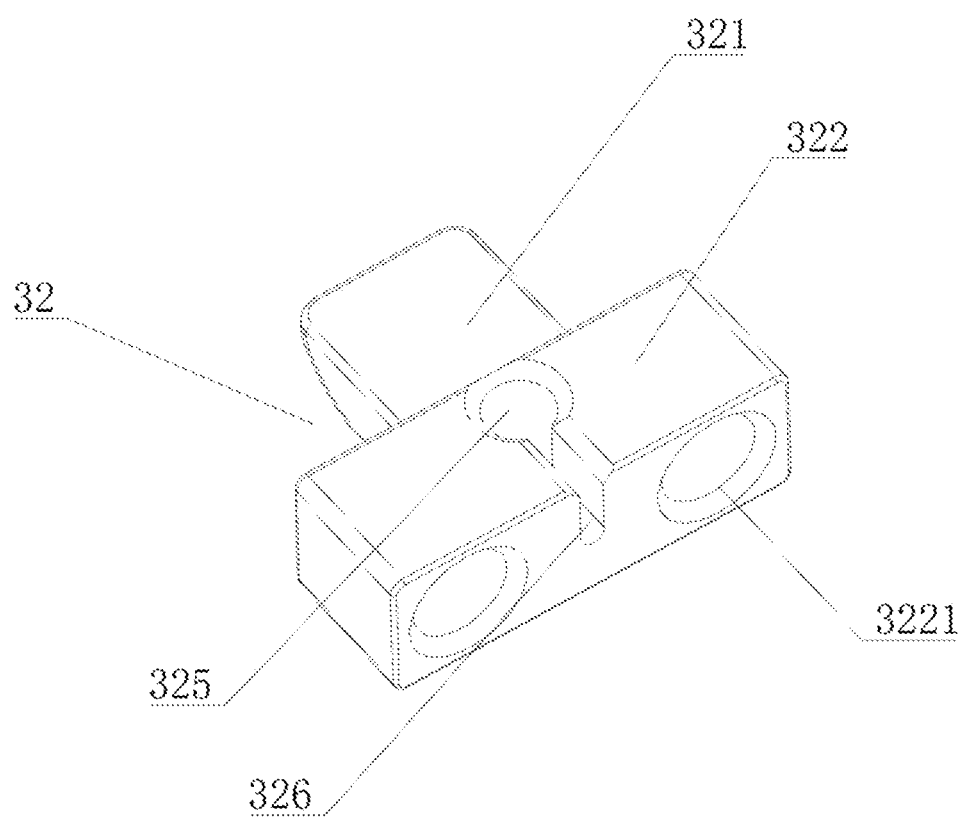
FIG. 13 is a schematic structural diagram of a locking member according to Embodiment 3.

Referring to FIG. 12 and FIG. 13, in this embodiment, the locking cartridge assembly 3 includes a locking cartridge 31, a locking member 32, and two locking springs 33.

The locking member 32 mainly includes a lock tongue 321 and a locking sliding plate 322. The lock tongue 321 is vertically connected to a middle portion of the locking sliding plate 322. Two spring slots 3221 are left-right symmetrically disposed on the side surface that is of the locking sliding plate 322 and that is back to the lock tongue 321. The locking member 32 includes a clamp hole 325 for the clamp column 431 to insert and a clamp slot 326 for the inhaul cable member 43 to extend out of the clamp hole 325.

The locking cartridge 31 is provided with a locking sliding slot 311 for the locking sliding plate 322 to slide and a locking cover plate 312 covering the locking sliding slot 311. The locking cartridge 31 is further provided with a first opening 313 for the lock tongue 321 to extend and a second opening 314 for the inhaul cable member 43 to extend.

Embodiment 4

Figure 14:
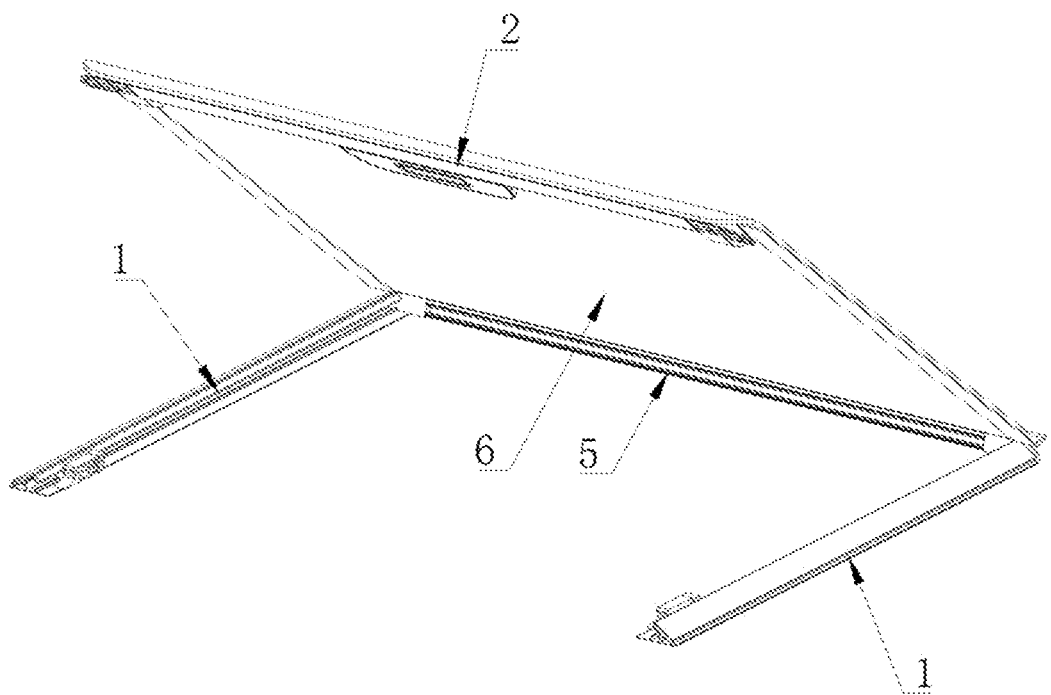
FIG. 14 is a schematic structural diagram of a pickup truck compartment cover according to Embodiment 4.

Referring to FIG. 14, a pickup truck compartment cover includes a fixing frame 5, a soft cover 6, and the locking structure in Embodiment 1. The fixing frame 5 may be a fixing horizontal frame. The fixing horizontal frame 5 is mounted at an end that is of the two fixing side frames 1 and that is away from the locking horizontal frame 2. The fixing horizontal frame 5 and the fixing side frames 1 are all fixedly mounted on a compartment of the pickup truck.

One end of the soft cover 6 is mounted on the fixing horizontal frame 5 and the other end is mounted on the locking horizontal frame 2. Two sides of the soft cover 6 respectively detachably match the corresponding fixing side frames 1 by using a hook-and-loop fastener, which includes, for example but not limited to, a velcro tape. Two sides of the soft cover 6 may also respectively detachably match the corresponding fixing side frames 1 by using a plurality of buckles.

Embodiment 5

In this embodiment, only the locking structure of the pickup truck compartment cover is different from that in Embodiment 4, and other structures of the pickup truck compartment cover are all the same as those of the pickup truck compartment cover in Embodiment 4.

The locking structure of the pickup truck compartment cover in this embodiment uses the locking structure in Embodiment 2.

Embodiment 6

In this embodiment, only the locking structure of the pickup truck compartment cover is different from that in Embodiment 4, and other structures of the pickup truck compartment cover are all the same as those of the pickup truck compartment cover in Embodiment 4.

The locking structure of the pickup truck compartment cover in this embodiment uses the locking structure in Embodiment 3.

The specific embodiments are merely explanation to the present disclosure but are not intended to limit the present disclosure. A person skilled in the art may make modifications to the embodiments without creative contributions after reading this specification based on requirements as long as falling with the scope of the claims of the present disclosure. All the modifications shall fall with the protection scope of the patent law.

What is claimed is:

1. A locking structure comprising two fixing side frames and a locking frame, wherein:

a locking slot is disposed on an inner side wall of the fixing side frame;

the locking frame is movably mounted at end portions of the two fixing side frames, locking cartridge assemblies corresponding to the fixing side frames are respectively disposed at both ends of the locking frame, and the locking frame is further provided, between the locking cartridge assemblies, with a sliding cartridge assembly controlling the locking cartridge assemblies to synchronously open;

the locking cartridge assembly comprises a locking cartridge, a locking member, and at least one locking spring, wherein the locking member is slidably mounted in the locking cartridge along a longitudinal direction of the locking frame, the locking member comprises a lock tongue inserted into the locking slot, one end of the at least one locking spring abuts against the locking cartridge, and the other end abuts against the locking member;

the sliding cartridge assembly comprises a control cartridge, a sliding handle, and an inhaul cable member, wherein the sliding handle is slidably mounted in the control cartridge along a direction perpendicular to the longitudinal direction of the locking frame, two ends of the inhaul cable member are respectively connected to the locking members of the locking cartridge assemblies, and the inhaul cable member abuts against the sliding handle; and when the locking frame is mounted at the end portions of the two fixing side frames, the at least one locking spring is configured to push the lock tongue to be clamped into the locking slot, and the sliding handle is configured to drive the inhaul cable member to make the lock tongue break away from the locking slot;

the control cartridge comprises a bottom cartridge and a cartridge cover;

the control cartridge comprises a control sliding slot for a control handle to slide, the control sliding slot is disposed on a bottom surface of the bottom cartridge;

the inhaul cable member runs through a left side surface and a right side surface of the control cartridge and abuts against a side on which the control handle faces the locking frame;

the control handle comprises a handheld slot on a side against from the control sliding slot; and the cartridge cover comprises a handle opening corresponding to the handheld slot.

2. The locking structure according to claim 1, wherein:
the locking cartridge is provided with a locking sliding slot and a locking cover plate covering the locking sliding slot;
the locking member further comprises a locking sliding plate matching the locking sliding slot; and
the locking cartridge further comprises a first opening for the lock tongue to extend and a second opening for ease of connection between the inhaul cable member and the locking member.

3. The locking structure according to claim 2, wherein:
the lock tongue is connected to a middle portion of the locking sliding plate;
the locking sliding plate comprises two spring slots that are symmetrically disposed at a side surface of the locking sliding plate opposite from the lock tongue; and
a number of the at least one locking spring in each of the locking cartridge assemblies is two and the at least one locking spring is respectively mounted in a corresponding spring slot.

4. The locking structure according to claim 3, wherein:
the locking member further comprises a pulling rod extending out of the locking cartridge from the second opening; and
the pulling rod comprises a mounting hole for mounting the inhaul cable member.

5. The locking structure according to claim 3, wherein:
a clamp column is disposed at either end of the inhaul cable member; and
the locking member comprises a clamp hole for inserting the clamp column and a clamp slot for the inhaul cable member to extend out of the clamp hole.

6. The locking structure according to claim 2, wherein:
the locking member comprises a mounting slot on a side surface facing a bottom surface of the locking sliding slot;
the locking cartridge comprises an abutment plate disposed on the bottom surface of the locking sliding slot, the abutment plate configured to insert into the mounting slot;
the locking spring is mounted in the mounting slot; and
one end of the locking spring is configured to abut against the abutment plate and another end of the locking spring is configured to abut against an inner side wall close to lock tongue in the mounting slot.

7. The locking structure according to claim 1, wherein:
the locking frame is mounted with a guide member on one side of the control cartridge; and
the guide member comprises a guide hole for the inhaul cable member to run through.

8. The locking structure according to claim 1, wherein:
each of the two fixing side frames further comprises a positioning seat;
the positioning seat comprises a positioning clamp slot;
a positioning protrusion matching the positioning clamp slot is disposed at either end of the locking frame;
a positioning end surface is further disposed at either end of the locking frame; and
when the positioning protrusion is clamped into a corresponding positioning clamp slot, the positioning end surface is attached to an end surface of the fixing side frame.

9. A pickup truck compartment cover, comprising:
a fixing frame and a soft cover;
a locking structure comprising two fixing side frames and a locking frame, wherein:
a locking slot is disposed on an inner side wall of the fixing side frame,
the locking frame is movably mounted at end portions of the two fixing side frames, locking cartridge assemblies corresponding to the fixing side frames are respectively disposed at both ends of the locking frame, and the locking frame is further provided, between the locking cartridge assemblies, with a sliding cartridge assembly controlling the locking cartridge assemblies to synchronously open,
the locking cartridge assembly comprises a locking cartridge, a locking member, and at least one locking spring, wherein the locking member is slidably mounted in the locking cartridge along a longitudinal direction of the locking frame, the locking member comprises a lock tongue inserted into the locking slot, one end of the at least one locking spring abuts against the locking cartridge, and the other end abuts against the locking member,
the sliding cartridge assembly comprises a control cartridge, a sliding handle, and an inhaul cable member, wherein the sliding handle is slidably mounted in the control cartridge along a direction perpendicular to the longitudinal direction of the locking frame, two ends of the inhaul cable member are respectively connected to the locking members of the locking cartridge assemblies, and the inhaul cable member abuts against the sliding handle, when the locking frame is mounted at the end portions of the two fixing side frames, the at least one locking spring is configured to push the lock tongue to be clamped into the locking slot, and the sliding handle is configured to drive the inhaul cable member to make the lock tongue break away from the locking slot, the fixing frame and the fixing side frames are all mounted in a compartment of a pickup truck, one end of the soft cover is mounted on the fixing frame and another end of the soft cover is mounted on the locking frame, and two sides of the soft cover respectively detachably match the fixing side frames, the control cartridge comprises a bottom cartridge and a cartridge cover, the control cartridge comprises a control sliding slot for a control handle to slide, the control sliding slot is disposed on a bottom surface of the bottom cartridge, the inhaul cable member runs through a left side surface and a right side surface of the control cartridge and abuts against a side on which the control handle faces the locking frame, the control handle comprises a handheld slot on a side against from the control sliding slot, and the cartridge cover comprises a handle opening corresponding to the handheld slot.

10. The pickup truck compartment cover according to claim 9, wherein:

the locking cartridge is provided with a locking sliding slot and a locking cover plate covering the locking sliding slot;

the locking member further comprises a locking sliding plate matching the locking sliding slot; and the locking cartridge further comprises a first opening for the lock tongue to extend and a second opening for ease of connection between the inhaul cable member and the locking member.

11. The pickup truck compartment cover according to claim 10, wherein:

the lock tongue is connected to a middle portion of the locking sliding plate;

the locking sliding plate comprises two spring slots that are symmetrically disposed at a side surface of the locking sliding plate opposite from the lock tongue; and a number of the at least one locking spring in each of the locking cartridge assemblies is two and the at least one locking spring is respectively mounted in a corresponding spring slot.

12. The pickup truck compartment cover according to claim 11, wherein:

the locking member further comprises a pulling rod extending out of the locking cartridge from the second opening; and the pulling rod comprises a mounting hole for mounting the inhaul cable member.

13. The pickup truck compartment cover according to claim 11, wherein:

a clamp column is disposed at either end of the inhaul cable member; and the locking member comprises a clamp hole for inserting the clamp column and a clamp slot for the inhaul cable member to extend out of the clamp hole.

14. The pickup truck compartment cover according to claim 10, wherein:

the locking member comprises a mounting slot on a side surface facing a bottom surface of the locking sliding slot;

the locking cartridge comprises an abutment plate disposed on the bottom surface of the locking sliding slot, the abutment plate configured to insert into the mounting slot;

the locking spring is mounted in the mounting slot; and one end of the locking spring is configured to abut against the abutment plate and another end of the locking spring is configured to abut against an inner side wall close to lock tongue in the mounting slot.

15. The pickup truck compartment cover according to claim 9, wherein:

the locking frame is mounted with a guide member on one side of the control cartridge; and the guide member comprises a guide hole for the inhaul cable member to run through.

16. The pickup truck compartment cover according to claim 9, wherein:

each of the two fixing side frames further comprises a positioning seat;

the positioning seat comprises a positioning clamp slot;

a positioning protrusion matching the positioning clamp slot is disposed at either end of the locking frame;

a positioning end surface is further disposed at either end of the locking frame; and when the positioning protrusion is clamped into a corresponding positioning clamp slot, the positioning end surface is attached to an end surface of the fixing side frame.

* * * * *